United States Patent
Takenouchi et al.

(10) Patent No.: US 8,910,760 B2
(45) Date of Patent: Dec. 16, 2014

(54) BRAKE SYSTEM FOR MOTORCYCLE

(75) Inventors: Kazuya Takenouchi, Wako (JP); Shuichi Fukaya, Wako (JP); Tetsuya Kudo, Wako (JP); Fuyuki Hosokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 13/370,709

(22) Filed: Feb. 10, 2012

(65) Prior Publication Data
US 2012/0205210 A1  Aug. 16, 2012

(30) Foreign Application Priority Data

Feb. 14, 2011  (JP) .................................. 2011-028729

(51) Int. Cl.
*B60T 13/66* (2006.01)
*B60T 8/17* (2006.01)
*B60T 8/26* (2006.01)

(52) U.S. Cl.
CPC .............. *B60T 8/261* (2013.01); *B60T 8/1706* (2013.01)
USPC ........ 188/349; 188/106 P; 188/344; 303/137; 303/186; 701/70

(58) Field of Classification Search
USPC ........ 188/349, 344, 106 P; 701/70; 303/9.64, 303/3, 9.62, 139, 119.1, 9.61, 137, 158, 186
See application file for complete search history.

(56) References Cited

U.S. PATENT DOCUMENTS

| | | | | | |
|---|---|---|---|---|---|
| 5,372,408 | A | * | 12/1994 | Tsuchida et al. | 303/9.64 |
| 6,409,285 | B1 | * | 6/2002 | Wakabayashi et al. | 303/9.64 |
| 2005/0168060 | A1 | * | 8/2005 | Tani et al. | 303/9.62 |
| 2006/0138858 | A1 | * | 6/2006 | Nakayama et al. | 303/9.64 |
| 2006/0170280 | A1 | | 8/2006 | Nakayama et al. | |
| 2006/0250022 | A1 | * | 11/2006 | Hasegawa et al. | 303/139 |
| 2011/0273005 | A1 | * | 11/2011 | Westerfeld | 303/9.64 |

FOREIGN PATENT DOCUMENTS

JP  2006-175993  7/2006

* cited by examiner

*Primary Examiner* — Anna Momper
*Assistant Examiner* — San Aung
(74) *Attorney, Agent, or Firm* — Squire Patton Boggs (US) LLP

(57) ABSTRACT

In a brake system for a vehicle, a first control mode and a second control mode are provided by which it is possible to cope with variations in the running environments such as changes between traveling on a public road and traveling on a circuit racecourse and variations in road conditions such as changes between a dry road surface and a wet road surface. A mode change-over switch is disposed between a kill switch on the upper side and a starter switch on the lower side, on the vehicle body center side relative to a right grip. Switching between the first control mode and the second control mode is carried out by use of the mode change-over switch.

16 Claims, 7 Drawing Sheets

BRAKE SYSTEM FOR MOTORCYCLE

BACKGROUND

1. Field

The present invention relates to a brake system for a motorcycle.

2. Description of the Related Art

By-wire type brake devices (BBW: brake-by-wire) have been put to practical use. In this type of brake device, an amount of operation on the brake (brake operation amount) is detected, then a hydraulic pressure is generated in a hydraulic modulator on the basis of the detected value, and a braking force is generated by the hydraulic pressure.

By the above-mentioned brake device (BBW), an ABS (antilock brake system) function can be exhibited.

Furthermore, there has been known a system in which not only the ABS function is exhibited by the brake device as above-mentioned but also front and rear brake devices are operated in an interlocked manner by operating one of front and rear brake operating members (see, for example, FIGS. 1 and 3 of Patent Document 1 (Japanese Patent Laid-Open No. 2006-175993)).

The system in which front-wheel and rear-wheel brake devices are operated in an interlocked manner is called a CBS (combined brake system). When a mode change-over switch 32 shown in FIG. 1 of Patent Document 1 is switched over, a CBS function is selected, whereby a front wheel braking force and a rear wheel braking force are controlled based on a predetermined correlation, as shown in FIG. 3 of Patent Document 1.

In this way, in the CBS function according to the related art, the front-rear distribution of braking force is unequivocally determined. From the driver's point of view, however, there is a demand for changing the front-rear distribution correspondingly to variations in the running environments such as changes between traveling on a public road and traveling on a circuit racecourse, or variations in road conditions such as changes between a dry road surface and a wet road surface. For instance, a desirable front-rear distribution at the time of straight forward traveling or that at the time of putting priority on vehicle body control during turning, in the case where the coefficient of friction ($\mu$) on a road is high and a high braking force at the tire can be expected, are different from the front-rear distributions favored in the case where the coefficient of friction on a road is low. Thus, there is a demand for changing the front-rear distribution of braking force according to the running environments. Accordingly, there is room for further improvement in order to make it possible to cope with variations in the front-rear distribution of braking force according to various parameters or environmental conditions.

SUMMARY

It is an object of the present invention to provide a brake system capable of realizing a front-rear distribution of braking force according to variations in the running environments.

According to one embodiment of the invention, there is provided a brake control system for a motorcycle, which is a by-wire type brake control system for a motorcycle and in which amounts of operation on front-wheel and rear-wheel brake operating units are detected. Hydraulic pressures are generated in front-wheel and rear-wheel hydraulic modulators on the basis of the detected values, and front-wheel and rear-wheel brake devices generate braking forces by the hydraulic pressures. The brake control system can be provided with a mode change-over unit configured to changing over a plurality of braking force control modes according to a driver's operation. A control mode can include a first section in which the braking force generated on a front wheel and the braking force generated on a rear wheel are both increased when the amount of operation on the front-wheel brake operating unit increases. A third section can be provided, in which the braking force generated on the front wheel is further increased whereas the braking force generated on the rear wheel is decreased when the amount of operation on the front-wheel brake operating unit further increases. The plurality of control modes can be a plurality of modes which differ from each other in the magnitude of the braking force generated on the rear wheel in the first section.

According to another embodiment of the invention, the plurality of control modes can include a first control mode and a second control mode, each of which has a second section between the first section and the third section. In the first control mode, when the front-wheel brake operating means is operated, a braking force is generated by the front-wheel brake device according to the operation amount of the front-wheel brake operating unit. A braking force interlocked with the operation amount of the front-wheel brake operating unit is generated on the rear wheel by the rear-wheel brake device for which no operation is made.

In a first mode first section in which the operation amount of the front-wheel brake operating unit ranges from zero to a first mode first predetermined value, the braking force generated on the rear wheel gradually increases correspondingly to an increase in the operation amount.

In a first mode second section in which the operation amount of the front-wheel brake operating unit ranges from the first mode first predetermined value to a first mode second predetermined value greater than the first mode first predetermined value, the braking force generated on the rear wheel is maintained at a maximum value in the first mode first section, irrespective of an increase in the operation amount.

In a first mode third section in which the operation amount of the front-wheel brake operating unit is in excess of the first mode second predetermined value, the braking force generated on the rear wheel gradually decreases to zero correspondingly to an increase in the operation amount.

In the second control mode, like in the first control mode, when the front-wheel brake operating unit is operated, a braking force is generated by the front-wheel brake device according to the operation amount of the front-wheel brake operating unit. A braking force interlocked with the operation amount of the front-wheel brake operating unit is generated on the rear wheel by the rear-wheel brake device for which no operation is made.

In a second mode first section in which the operation amount of the front-wheel brake operating unit ranges from zero to a second mode first predetermined value, the braking force generated on the rear wheel gradually increases correspondingly to an increase in the operation amount, and this braking force is set to be smaller than the corresponding braking force generated on the rear wheel in the first mode first section.

The electronic control unit can cause the front-wheel and rear-wheel brake devices to generate braking forces according to the control mode selected.

According to another embodiment of the invention, in the second control mode, like in the first control mode, in a second mode second section in which the operation amount of the front-wheel brake operating unit ranges from the second mode first predetermined value to a second mode second predetermined value greater than the second mode first predetermined value, the braking force generated on the rear wheel is maintained at a maximum value in the second mode first section irrespectively of an increase in the operation amount. This braking force is controlled to be smaller than the corresponding braking force generated on the rear wheel in the first mode second section.

According to another embodiment of the invention, in the second control mode, like in the first control mode, in a second mode third section in which the operation amount of the front-wheel brake operating unit is in excess of the second mode second predetermined value, the braking force generated on the rear wheel gradually decreases correspondingly to an increase in the operation amount. The operation amount at a point where the braking force is minimized is set to be greater than the corresponding operation amount in the first control mode.

According to another embodiment of the invention, the mode change-over unit is a switch provided on a handle bar. According to another embodiment of the invention, the first control mode and the second control mode are so configured that when the rear-wheel brake operating unit is operated, a braking force is generated by the rear-wheel brake device according to the operation amount of the rear-wheel brake operating unit. A braking force interlocked with the operation amount of the rear-wheel brake operating unit is generated by the front-wheel brake device for which no operation is made.

The braking force generated on the rear wheel is set to be greater than the braking force generated on the front wheel.

The operation amount of the rear-wheel brake operating unit at which braking of the front wheel is started is set to be greater in the second control mode than in the first control mode.

According to embodiment of the invention, the plurality of modes are provided so that the degree of increase in the braking force generated on the rear wheel can be set differently in relation to the braking force generated on the front wheel.

When the degree of increase in the braking force generated on the rear wheel is set to be comparatively high, the front-wheel and rear-wheel braking forces are given priority, so that the driver can focus on deceleration of the vehicle.

When the degree of increase in the braking force generated on the rear wheel is set to be moderate, the operation amount on the rear wheel side, particularly at the time of turning, is rather enlarged, so that the range of control is widened.

According to other embodiments of the invention, in the first section (in a beginning section of braking), the braking force generated on the rear wheel by the front-wheel brake operating unit is suppressed in the second control mode as compared with that in the first control mode. The second control mode can be used, for example, as a mode effective in the case of a driver's desire to put priority on attitude control for turning performance over braking during cornering.

According to other embodiments of the invention, it is possible to control the attitude by the braking force generated on the front wheel, more favorably in the second control mode than in the first control mode.

According to other embodiments of the invention, for example in the case where it is desired to accomplish deceleration in as short a time as possible, both a braking force on the front wheel and a braking force on the rear wheel can be generated effectively.

As compared with the first control mode, the second control mode makes it possible to easily generate both the braking forces in a maximal manner at the time of, for example, full-braking or the like. Besides, in the second control mode, the driver is not required to operate both the front-wheel brake operating unit and the rear-wheel brake operating unit, and an operation of only the front-wheel brake operating unit suffices. In other words, at the time of full-braking, rather the second control mode than the first control mode ensures that an ideal front-rear distribution of braking can be automatically carried out, and that the driver can focus on a front-wheel braking operation.

According to other embodiments of the invention, the mode change-over unit is provided on the handle bar. The mode change-over unit permits the driver to perform change-over operations while gripping the grip, and is therefore easier to use.

According to other embodiments of the invention, the braking force generated on the rear wheel is set to be greater than the braking force generated on the front wheel, and the operation amount of the rear-wheel brake operating unit until the braking of the front wheel is started is set to be greater in the second control mode than in the first control mode.

Where the front-wheel brake operating unit is a brake lever whereas the rear-wheel brake operating unit is a brake pedal, it is said that the brake pedal operated by foot needs a more delicate operation as compared with the brake lever operated by hand. According to the present invention, the deceleration by the foot operation which is said to need a delicate operation can be carried out assuredly.

DETAILED DESCRIPTION

An embodiment of the present invention will be described below, based on the accompanying drawings. Incidentally, the drawings are to be viewed according to the orientation of reference symbols.

An embodiment of the present invention will be described, based on the drawings.

Figure 1:
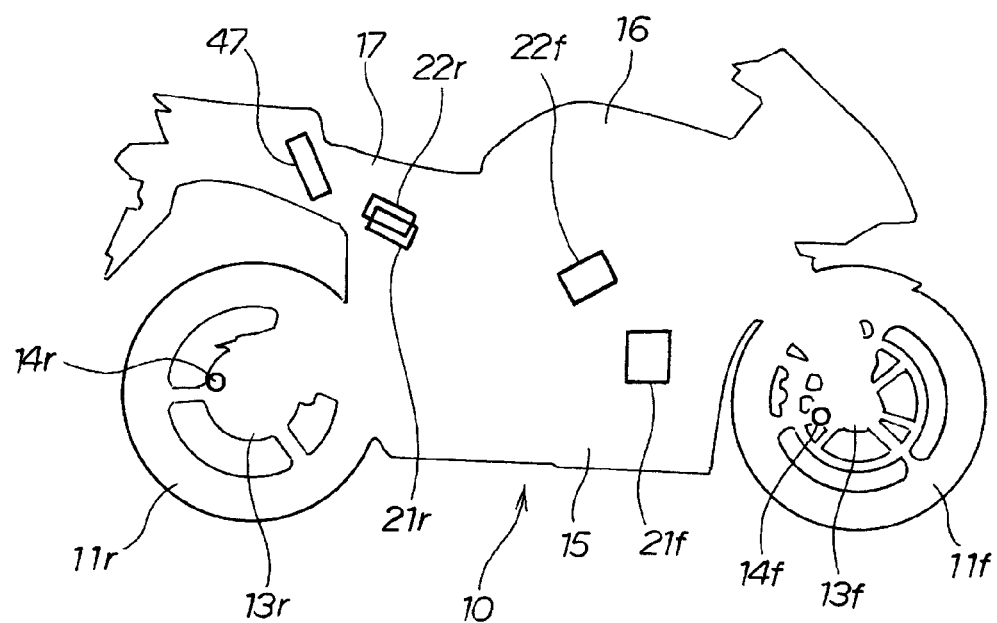
FIG. 1 is a right side view (conceptual diagram) of a motorcycle according to an embodiment of the present invention.

As shown in the example of FIG. 1, a motorcycle has a front wheel 11$f$ (f is a suffix indicative of front, here and below) accompanied by a pulser ring 13$f$, and has a front wheel speed sensor 14$f$ provided on a vehicle body 15 so as to detect the rotational speed of the front wheel 11$f$ by counting pulses relevant to the pulser ring 13$f$, whereby the front wheel speed can always be detected.

Further, the motorcycle 10 has a rear wheel 11$r$ (r is a suffix indicative of rear, here and below) accompanied by a brake disk 12$r$ and a pulser ring 13$r$, and has a rear wheel speed sensor 14$r$ provided on the vehicle body 15 so as to detect the rotational speed of the rear wheel 11$r$ by counting pulses relevant to the pulser ring 13$r$, whereby the rear wheel speed can always be detected.

The motorcycle 10 can have a front-wheel hydraulic modulator 21$f$ and a front-wheel valve unit 22$f$ provided on the vehicle body 15 at positions under a fuel tank 16 provided on the vehicle body 15. In addition, the motorcycle 10 can have a rear-wheel hydraulic modulator 21$r$ and a rear-wheel valve unit 22r provided at positions under a seat 17 provided on the vehicle body 15. An electronic control unit 47 can be disposed rearwardly of the seat 17.

Figure 2:
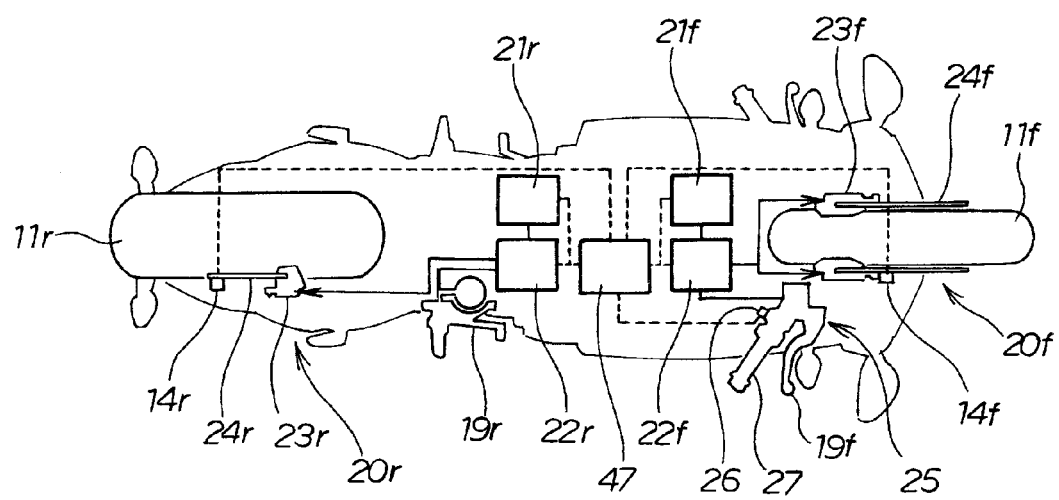
FIG. 2 is a plan view (conceptual diagram) of the motorcycle.

As shown in FIG. 2, the front wheel 11f is braked by a front-wheel brake device 20f, and the rear wheel 11r by a rear brake device 20r. Each of the brake devices operates according to an operation amount of a front-wheel brake operating unit or means 19f represented by a brake lever or an operation amount of a rear-wheel brake operating unit or means 19r represented by a brake pedal.

The front-wheel brake device 20f can include, for example, the front-wheel hydraulic modulator 21f (the structure of which will be described later), the front-wheel valve unit 22f, a brake caliper 23f and a brake disc 24f.

The rear brake device 20r can include, for example, the rear-wheel hydraulic modulator 21r, the rear-wheel valve unit 22r, a brake caliper 23r and a brake disc 24r.

In the vicinity of the front-wheel brake operating means 19f, a mode change-over unit or means 26 is provided on a handle bar 25.

Figure 3:
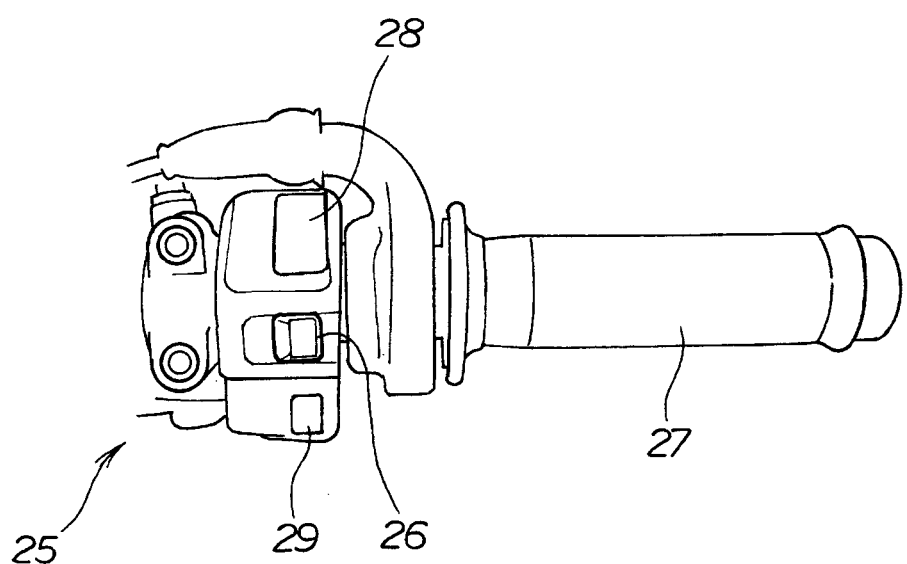
FIG. 3 is an illustration of the layout of a mode change-over means.

As shown in FIG. 3, the mode change-over means 26 is disposed between a kill switch 28 on an upper side and a starter switch 29 on a lower side, on the vehicle body center side relative to a right grip 27. The mode change-over means 26 is preferably a change-over switch which makes change-over (selection) between a first control mode and a second control mode when moved to the left or the right. The change-over switch may be a push-push switch which, when depressed repeatedly, effects selection of the first control mode and selection of the second control mode in an alternating manner.

The mode change-over switch 26 may be provided not only on the handle bar 25 but also in the periphery of meters or in the periphery of a combination switch. It is recommendable, however, to provide the mode change-over means 26 on the handle bar 25, like in the present embodiment, since this configuration permits the driver to perform change-over operations while gripping the right grip 27.

A preferred embodiment of the front-wheel hydraulic modulator 21f will be described based on FIG. 4.

Figure 4:
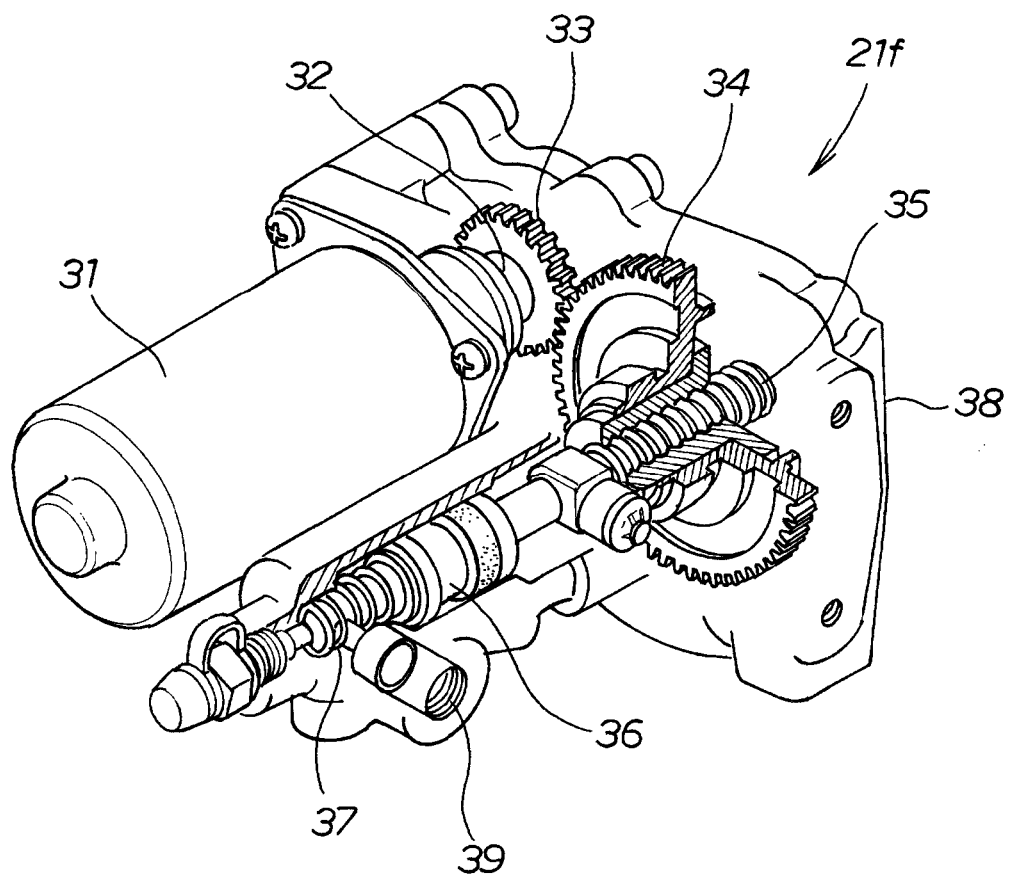
FIG. 4 is a perspective view of a hydraulic modulator.

As shown in FIG. 4, the front-wheel hydraulic modulator 21f can include a control motor 31, a drive gear 33 is driven by a motor shaft 32 of the control motor 31. A driven gear 33 greater than the drive gear 33 in diameter is driven by the drive gear 33. A ball screw 35 is screw-connected to the driven gear 34 and is configured to be moved in an axial direction though not rotated. A modulator piston 36 is configured to be pushed by the ball screw 35, and a return spring 37 biases the modulator piston 36. A case 38 houses the drive gear 33, the driven gear 34 and the modulator piston 36 collectively.

When the modulator piston 36 is advanced or moved forward with the control motor 31 as a drive source, a brake fluid is put under pressure or compressed, to generate a hydraulic pressure. The hydraulic pressure is sent through a port 39 to the front-wheel valve unit (reference symbol 22f in FIG. 2). When the control motor 31 is rotated in a reverse direction so that the modulator piston 36 is retracted (moved backward), the brake fluid is unpressurized or decompressed.

The rear-wheel hydraulic modulator (reference symbol 21r in FIG. 2) is the same as the front-wheel hydraulic modulator 21f in structure, and, therefore, description thereof is omitted.

The configuration of the front-wheel valve unit 22f and the rear-wheel valve unit 22r will now be described, based on FIG. 5.

Figure 5:
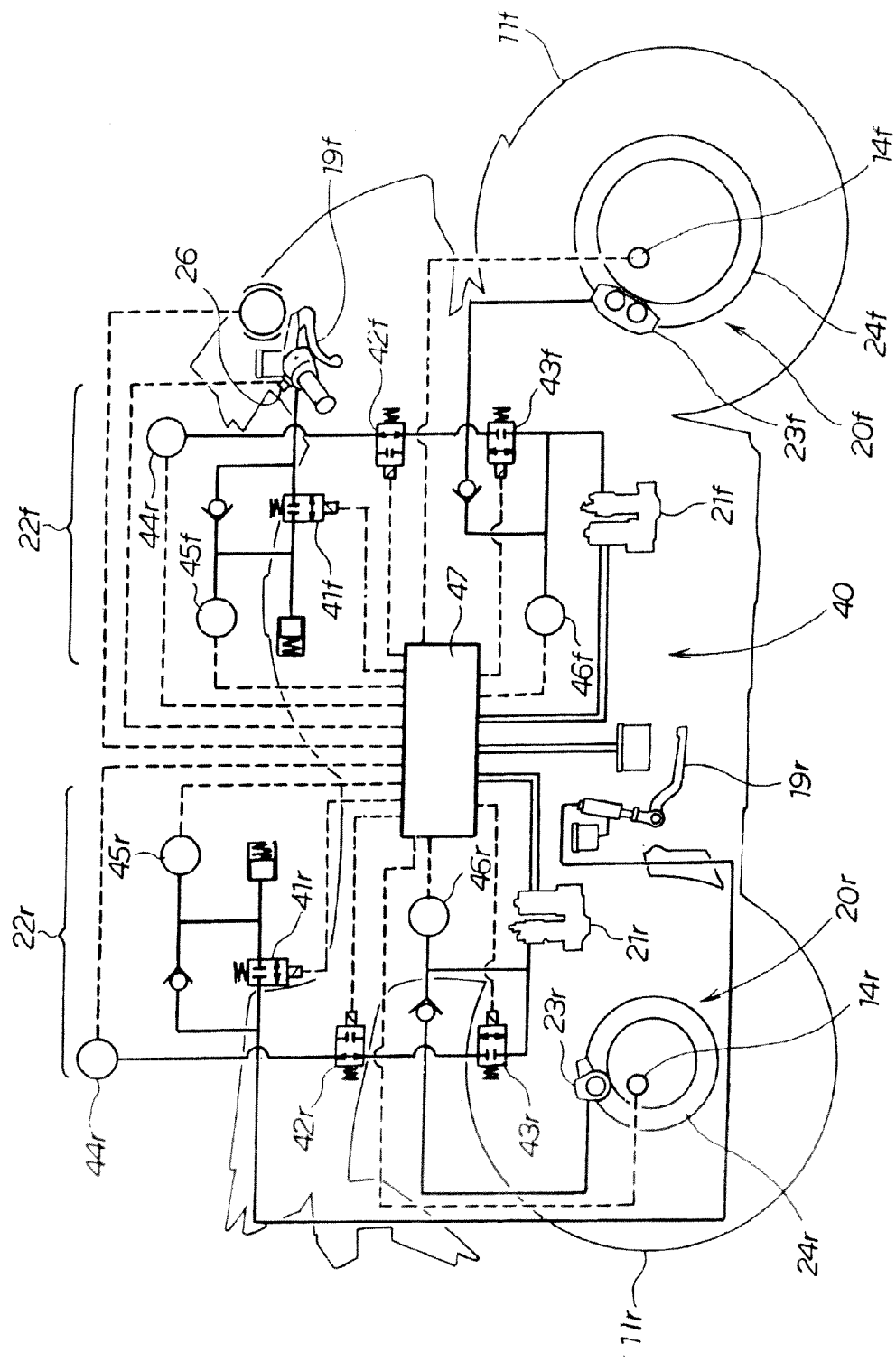
FIG. 5 is a circuit diagram of a brake control system in the motorcycle according to an embodiment of the present invention.

FIG. 5 is a combined ABS control diagram illustrating an example of a brake control system 40 of the motorcycle. The front-wheel valve unit 22f as a major part of the brake control system 40 includes a normally closed type first solenoid valve 41f, a normally open type second solenoid valve 42f, a normally closed type third solenoid valve 43f, a first pressure sensor 44f, a second pressure sensor 45f, and a third pressure sensor 46f as main components.

The rear-wheel valve unit 22r is the same as mentioned above; therefore, the components thereof are denoted by numerals accompanied by suffix r, and description thereof will be omitted.

Operation of a CBS (combined brake system) for interlocking the front-wheel and rear-wheel brake devices 20f and 20r will be described.

The CBS is a system for causing the front-wheel and rear-wheel brake devices 20f, 20r to exhibit braking actions when the front-wheel one of the front-wheel and rear-wheel brake operating units or means 19f, 19r is operated.

An example in which the front-wheel brake operating means 19f is operated will now be described.

In this case, the first solenoid valve 41f and the second solenoid valve 42f for the front wheel are opened, whereas the third solenoid valve 43f for the front wheel is closed. On the other hand, the second solenoid valve 42r for the rear is opened, whereas the third solenoid valve 43r for the rear is closed.

When the front-wheel brake operating means 19f is operated, a hydraulic pressure is generated, and the hydraulic pressure is detected by the second pressure sensor 45f. Based on the detected pressure value, the electronic control unit 47 determines a target value (pressure value) for the front-wheel third pressure sensor 46f and a target value (pressure value) for the rear third pressure sensor 46r. In addition, the electronic control unit 47 operates the front-wheel hydraulic modulator 21f and the rear-wheel hydraulic modulator 21r so that the front-wheel and rear-wheel hydraulic modulators 21f, 21r generate hydraulic pressures at the target values (pressure values), whereby the front wheel 11f and the rear wheel 11r are braked by the front-wheel and rear-wheel brake devices 20f, 20r.

When the rear-wheel brake operating means 19r is operated, also, the electronic control unit 47 determines a target value (pressure value) for the front-wheel third pressure sensor 46f and a target value (pressure value) for the rear third pressure sensor 46r. Besides, the electronic control unit 47 operates the front-wheel hydraulic modulator 21f and the rear-wheel hydraulic modulator 21r so that the front-wheel and rear-wheel hydraulic modulators 21f, 21r generate hydraulic pressures at the target values (pressure values), whereby the front wheel 11f and the rear wheel 11r are braked by the front-wheel and rear-wheel brake devices 20f, 20r.

In addition, by switching over the mode change-over means 26 by hand, it is possible in embodiments of the invention to set a diversity of target values (control modes) and to create a variety of braking modes.

As the control mode, a plurality (in this example, two) of modes are provided. A first control mode and a second control mode are each configured (as a presumption) so that when the front-wheel brake operating means 19f is operated, a braking force for the front wheel is generated by the front-wheel brake device 20f according to an operation amount of the front-wheel brake operating means 19f. A braking force for the rear wheel interlocked with the operation amount of the front-wheel brake operating means 19f is generated by the rear-wheel brake device 20r for which no operation is made. In the alternative, when the rear-wheel brake operating means 19r is operated, a braking force for the rear wheel is generated by the rear-wheel brake device 20r according to an operation amount of the rear-wheel brake operating means 19r. A braking force for the front wheel interlocked with the operation amount of the rear-wheel brake operating means 19r is generated by the front-wheel brake device 20f for which no operation is made.

Figure 6:
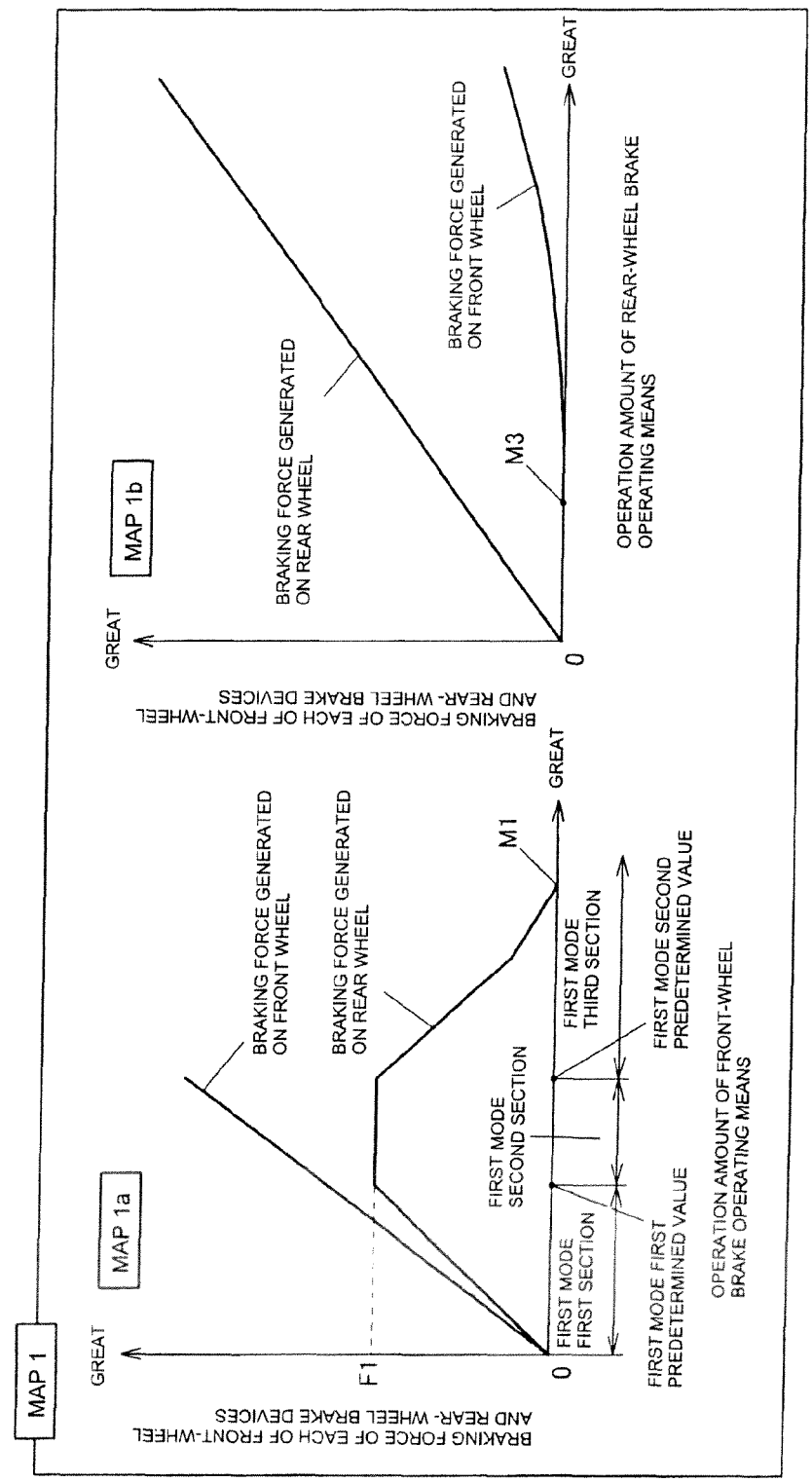
FIG. 6 is a map diagram concerning a first control mode.
Figure 7:
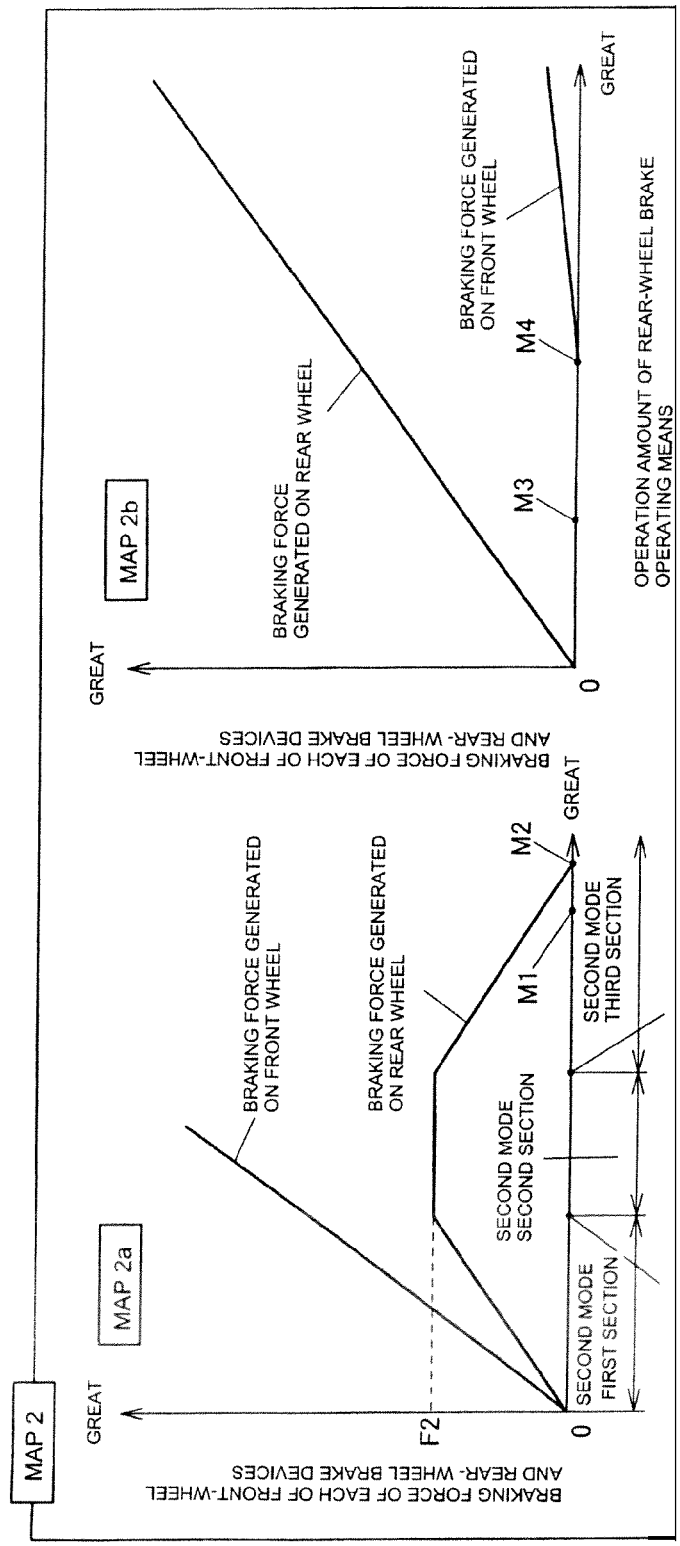
FIG. 7 is a map diagram concerning a second control mode.

When the first control mode is selected by the mode change-over means 26, Map 1 shown in FIG. 6 can be selected in the electronic control unit 47, whereas when the second control mode is selected by the mode change-over means 26, Map 2 shown in FIG. 7 is selected in the electronic control unit 47.

As shown in FIG. 6, Map 1 includes Map 1a and Map 1b.

In Map 1a, the axis of abscissas (x-axis) represents the operation amount of the front-wheel brake operating means, and the axis of ordinates (y-axis) represents the braking force of each of the front-wheel and rear-wheel brake devices. In the figure, the substantially linear-functional curve (with an expression "BRAKING FORCE GENERATED ON FRONT WHEEL") is a curve of a braking force provided for the front-wheel brake device, and a substantially trapezoidal curve (with an expression "BRAKING FORCE GENERATED ON REAR WHEEL") is a curve of a braking force provided for the rear-wheel brake device.

In other words, when the front-wheel brake operating means is operated under the condition where the first control mode is selected by the mode change-over means 26, Map 1a is selected.

The operation amount of the front-wheel brake operating means taken on the axis of abscissas can be determined from the value detected by the second pressure sensor, illustrated in this example as 45f or 45r in FIG. 5. Besides, the braking forces of the front-wheel and rear-wheel brake devices taken on the axis of ordinates are obtained by conversion from the target values of hydraulic pressure which are given to the third pressure sensor, shown as 46f or 46r in FIG. 5 and the hydraulic modulator 21f or 21r in FIG. 5 by the electronic control unit 47.

Referring to the substantially trapezoidal curve in Map 1a, in a first-mode first section where the operation amount of the front-wheel brake operating means ranges from zero to a first-mode first predetermined value, the braking force generated on the rear wheel gradually increases correspondingly to an increase in the operation amount.

In a first-mode second section where the operation amount of the front-wheel brake operating means ranges from the first-mode first predetermined value to a first-mode second predetermined value greater than the first-mode first predetermined value, the braking force generated on the rear wheel is maintained at a maximum value F1 in the first-mode first section, irrespective of an increase in the operation amount.

In a first-mode third section where the operation amount of the front-wheel brake operating means is in excess of the first-mode second predetermined value, the braking force generated on the rear wheel gradually decreases, for example to zero in the case shown in the drawing, correspondingly to an increase in the operation amount.

In Map 1b, the axis of abscissas represents the operation amount of the rear-wheel brake operating means, and the axis of ordinates represents the braking force of each of the front-wheel and rear-wheel brake devices. The substantially linear-functional curve (with an expression "BRAKING FORCE GENERATED ON REAR WHEEL") is a curve of a braking force provided for the rear-wheel brake device, and a substantially bent-line-like curve (with an expression "BRAKING FORCE GENERATED ON FRONT WHEEL") is a curve of a braking force provided for the front-wheel brake device.

In other words, when the rear-wheel brake operating means is operated under the condition where the first control mode is selected by the mode change-over means 26, Map 1b is selected.

In addition, as shown in FIG. 7, Map 2 includes Map 2a and Map 2b.

In Map 2a, the axis of abscissas represents the operation amount of the front-wheel brake operating means, and the axis of ordinates represents the braking force of each of the front-wheel and rear-wheel brake devices. The substantially linear-functional curve (with an expression "BRAKING FORCE GENERATED ON FRONT WHEEL") is a curve of a braking force provided for the front-wheel brake device, and the substantially trapezoidal curve (with an expression "BRAKING FORCE GENERATED ON REAR WHEEL") is a curve of a braking force provided for the rear-wheel brake device.

In other words, when the front-wheel brake operating means is operated under the condition where the second control mode is selected by the mode change-over means 26, Map 2a is selected.

Paying attention to the substantially trapezoidal curve in Map 2a, in a second-mode first section where the operation amount of the front-wheel brake operating means ranges from zero to a second-mode first predetermined value, the braking force generated on the rear wheel gradually increases correspondingly to an increase in the operation amount.

In a second-mode second section where the operation amount of the front-wheel brake operating means ranges from the second-mode first predetermined value to a second-mode second predetermined value greater than the second-mode first predetermined value, the braking force generated on the rear wheel is maintained at a maximum value F2 in the second-mode first section, irrespectively of an increase in the operation amount.

In a second-mode third section where the operation amount of the front-wheel brake operating means is in excess of the second-mode second predetermined value, the braking force generated on the rear wheel gradually decreases, for example to zero in the case shown in the drawing, correspondingly to an increase in the operation amount.

In Map 2b, the axis of abscissas represents the operation amount of the rear-wheel brake operating means, and the axis of ordinates represents the braking force of each of the front-wheel and rear-wheel brake devices. The substantially linear-functional curve (with an expression "BRAKING FORCE GENERATED ON REAR WHEEL") is a curve of a braking force provided for the rear-wheel brake device, and the substantially bent-line-like curve (with an expression "BRAKING FORCE GENERATED ON FRONT WHEEL") is a curve of a braking force provided for the front-wheel brake device.

In other words, when the rear-wheel brake operating means is operated under the condition where the second control mode is selected by the mode change-over means 26, Map 2b is selected.

Map 2a differs from Map 1a in the following points.

The braking force F2 is smaller than the braking force F1. In other words, the braking force generated on the rear wheel in the second-mode first section is set to be smaller than the braking force generated on the rear wheel in the first-mode first section.

In addition, the second-mode first section is set longer than the first-mode first section, the second-mode second section is set longer than the first-mode second section, and the second-mode third section is set longer than the first-mode third section.

In the first section (a beginning section of braking), the braking force generated on the rear wheel by the front-wheel brake operating means is suppressed in the second control mode, as compared with that in the first control mode. The second control mode can be used, for example, as a mode effective in the case of a driver's wish to put priority on attitude control for turning performance over braking during cornering.

In the second section, the braking force generated on the rear wheel is kept constant. In addition, the braking force F2 generated on the rear wheel in the second-mode second section shown in Map 2a is set to be smaller than the braking force F1 generated on the rear wheel in the first-mode second section shown in Map 1a.

As compared with the first control mode, the second control mode is a mode effective in the case where the attitude of the vehicle is controlled by the braking force generated on the rear wheel.

In the first-mode third section in Map 1a, the braking force generated on the rear wheel is gradually decreased, for example, to zero. The value on the axis of abscissas (the operation amount of the front-wheel brake operating means) at the time when the braking force on the rear wheel reaches zero is denoted by M1.

Similarly, in the second-mode third section in Map 2a, the braking force generated on the rear wheel is gradually decreased, for example, to zero. The value on the axis of abscissas (the operation amount of the front-wheel brake operating means) at the time when the braking force on the rear wheel reaches zero is denoted by M2.

For reference, M1 in Map 1a is transcribed into Map 2a. In the present invention, a setting of M1<M2 is adopted. Specifically, a case is illustrated in the drawings wherein like the first control mode (Map 1a) the second control mode (Map 2a) is so configured that in the second-mode third section where the operation amount of the front-wheel brake operating means is in excess of the second-mode second predetermined value, the braking force generated on the rear wheel decreases, for example to zero, correspondingly to an increase in the operation amount. Besides, in this case, the operation amount M2 when the braking force reaches zero in the second control mode is set to be greater than the corresponding operation amount M1 in the first control mode.

For instance in the case where deceleration is to be accomplished in as short a time as possible, it is desirable to effectively generate both a braking force on the front wheel and a braking force on the rear wheel.

As compared with the first control mode, the second control mode makes it possible to easily generate both the braking forces in a maximal manner at the time of, for example, full-braking or the like. Besides, in the second control mode, the driver is not required to operate both the front-wheel brake operating means and the rear-wheel brake operating means, and an operation of only the front-wheel brake operating means suffices. In other words, at the time of full-braking, rather the second control mode than the first control mode ensures that an ideal front-rear distribution of braking can be automatically carried out, and that the driver can focus on a front-wheel braking operation.

The front-wheel brake operating means is preferably a front brake provided in the motorcycle, whereas the rear-wheel brake operating means is preferably a brake pedal.

In Map 1a shown in FIG. 6, when the front-wheel brake operating means is operated, particularly, the braking force generated on the front wheel in the first-mode third section is increased. The same applies in Map 2a in FIG. 7.

A control suited to the characteristics peculiar to a motorcycle is performed in which the vertical load (grip force) on the front wheel increases whereas the vertical load on the rear wheel decreases, as the braking force becomes stronger.

Now, attention is paid to Map 1b in FIG. 6 and Map 2b in FIG. 7.

Map 1b in FIG. 6 relates to the first control mode. In this mode, as shown in Map 1b, when the rear-wheel brake operating means is operated, a control is performed such that a braking force is generated by the rear brake device according to the operation amount of the rear-wheel brake operating means and that a braking force interlocked with the operation amount of the rear-wheel brake operating means is generated by the front-wheel brake device for which no operation is made. In addition, the braking force generated on the rear wheel is set greater than the braking force generated on the front wheel.

Map 2b in FIG. 7 relates to the second control mode. In this mode, as shown in Map 2b, when the rear-wheel brake operating means is operated, a control is performed such that a braking force is generated by the rear brake device according to the operation amount of the rear-wheel brake operating means and that a braking force interlocked with the operation amount of the rear-wheel brake operating means is generated by the front-wheel brake device for which no operation is made. Besides, the braking force generated on the rear wheel is set greater than the braking force generated on the front wheel.

The braking force generated on the front wheel is so set as to be generated starting from a point remote from the origin by M4.

For reference, M3 in Map 1b is transcribed into Map 2b. In the present invention, a setting of M3<M4 is adopted. Specifically, the operation amounts M3, M4 of the rear-wheel brake operating means until braking of the front wheel is started are so set that the operation amount M4 in the second control mode is greater than the operation amount M3 in the first control mode.

In the first control mode shown in Map 1b, the braking force generated on the front wheel is generated earlier than in the second control mode; therefore, the interlocked brake operates even from an early stage of the braking operation, whereby assured deceleration can be accomplished.

Where the front-wheel brake operating means is a brake lever whereas the rear-wheel brake operating means is a brake pedal, it is said that the brake pedal operated by foot needs a more delicate operation as compared with the brake lever operated by hand. According to Map 1b, the deceleration by the foot operation which is said to need a delicate operation can be carried out assuredly.

On the contrary, in the second control mode, as shown in Map 2b, the braking force to be generated on the front wheel is not yet generated in an early stage of the braking operation; in this stage, therefore, a control in which attitude control is given priority over braking is carried out.

As above described, according to embodiments of the present invention, by arbitrary change-over between the first control mode (Map 1) and the second control mode (Map 2) it is possible to perform braking control for a motorcycle according to variations in running environments and operating parameters.

DESCRIPTION OF REFERENCE SYMBOLS

10 . . . Motorcycle, 19f . . . Front-wheel brake operating means, 19r . . . Rear-wheel brake operating means, 20f . . . Front-wheel brake device, 20r . . . Rear brake device, 21f . . .

Front-wheel hydraulic modulator, 21r . . . Rear-wheel hydraulic modulator, 25 . . . Handle bar, 26 . . . Mode change-over means, 40 . . . Brake control system, 47 . . . Electronic control unit.

The invention claimed is:

1. A brake control system for a vehicle, said system comprising:
a front wheel brake operating unit;
a rear wheel brake operating unit;
an electronic control unit configured to detect amounts of operation on the front wheel and rear wheel brake operating units;
a front wheel hydraulic modulator;
a rear wheel hydraulic modulator, wherein the front wheel and rear wheel hydraulic modulators are configured to generate hydraulic pressures based upon detected amounts of operation;
a front wheel braking device;
a rear wheel braking device, wherein the front wheel braking device and rear wheel braking device generate braking forces based upon the hydraulic pressures;
a mode change-over unit configured to change over a plurality of braking force control mode according to a switch operated by a vehicle operator,
wherein each of the plurality of braking force control modes provided by the mode changer-over unit include a first section wherein the braking force generated on a front wheel of the vehicle and a braking force generated on a rear wheel of the vehicle are both increased when the amount of operation on the front-wheel brake operating unit increases, and a third section in which the braking force generated on the front wheel is further increased and wherein the braking force generated on the rear wheel is decreased when the amount of operation on the front-wheel brake operating unit further increases, and wherein the plurality of control modes include modes which differ from each other in a magnitude of the braking force generated on the rear wheel in the first section,
wherein the plurality of braking force control modes include a first control mode and a second control mode,
wherein in a first mode first section in which the operation amount of said front-wheel brake operating unit ranges from zero to a first mode first predetermined value, the braking force generated on said rear wheel gradually increases correspondingly to an increase in said operation amount,
wherein in a second mode first section in which the operation amount of said front-wheel brake operating unit ranges from zero to a second mode first predetermined value, the braking force generated on said rear wheel gradually increases correspondingly to an increase in said operation amount, and this braking force is set to be smaller than the corresponding braking force generated on said rear wheel in said first mode first section, and
wherein in said second control mode, like in said first control mode, in a second mode second section in which the operation amount of said front-wheel brake operating unit ranges from said second mode first predetermined value to a second mode second predetermined value greater than said second mode first predetermined value, the braking force generated on said rear wheel is maintained at a maximum value in said second mode first section irrespectively of an increase in said operation amount, and this braking force is controlled to be smaller than the corresponding braking force generated on said rear wheel in said first mode second section.

2. The brake control system according to claim 1, wherein:
wherein in the first control mode, when the front-wheel brake operating unit is operated, the braking force generated by the front wheel brake device is generated according to the operation amount of the front-wheel braking unit, wherein a braking force interlocked with the operation amount of the front-wheel brake operating unit is generated on the rear wheel by the rear wheel brake device for which no operation is made,
wherein in a first mode second section in which the operation amount of said front-wheel brake operating unit ranges from said first mode first predetermined value to a first mode second predetermined value greater than said first mode first predetermined value, the braking force generated on said rear wheel is maintained at a maximum value in said first mode first section, irrespectively of an increase in said operation amount,
wherein in a first mode third section in which the operation amount of said front-wheel brake operating unit is in excess of said first mode second predetermined value, the braking force generated on said rear wheel gradually decreases to zero correspondingly to an increase in said operation amount,
wherein said second control mode when said front-wheel brake operating unit is operated, a braking force is generated by said front-wheel brake device according to the operation amount of said front-wheel brake operating unit whereas a braking force interlocked with the operation amount of said front-wheel brake operating unit is generated on said rear wheel by said rear-wheel brake device for which no operation is made,
and
wherein said electronic control unit causes said front-wheel and rear-wheel brake devices to generate braking forces according to the control mode selected.

3. The brake control system according to claim 2, wherein said second control mode like in said first control mode, in a second mode third section in which the operation amount of said front-wheel brake operating unit is in excess of said second mode second predetermined value, the braking force generated on said rear wheel decreases correspondingly to an increase in said operation amount, and said operation amount at a point where said braking force is minimized is set to be greater than the corresponding operation amount in said first control mode.

4. The brake control system according to claim 1, wherein said mode change-over unit comprises a switch provided on a handle bar.

5. The brake control system according to claim 4, wherein said first control mode and said second control mode are configured that when said rear-wheel brake operating unit is operated, a braking force is generated by said rear-wheel brake device according to the operation amount of said rear-wheel brake operating unit whereas a braking force interlocked with said operation amount of said rear-wheel brake operating unit is generated by said front-wheel brake device for which no operation is made,
wherein the braking force generated on said rear wheel is set to be greater than the braking force generated on said front wheel; and
wherein the operation amount of said rear-wheel brake operating unit at which braking of said front wheel is started is set to be greater in said second control mode than in said first control mode.

6. A motorcycle, said motorcycle comprising the brake control system according to claim 1.

7. A brake control system for a vehicle, said system comprising:
- a front wheel brake operating means for receiving brake actuation input;
- a rear wheel brake operating means for receiving brake actuation input;
- an electronic control for detecting amounts of operation on the front wheel and rear wheel brake operating means;
- a front wheel hydraulic modulator means for modulating hydraulic pressure;
- a rear wheel hydraulic modulator means for modulating hydraulic pressure, wherein the front wheel and rear wheel hydraulic means are configured to generate hydraulic pressures based upon detected amounts of operation;
- a front wheel braking means for front braking;
- a rear wheel braking means for rear braking, wherein the front wheel braking means and rear wheel braking means generate braking forces based upon the hydraulic pressures;
- a mode change-over means for changing over a plurality of braking force control mode according to a switch operated by a vehicle operator,
- wherein each of the plurality of braking force control modes provided by the mode changer-over means include a first section wherein the braking force generated on a front wheel of the vehicle and a braking force generated on a rear wheel of the vehicle are both increased when the amount of operation on the front-wheel brake operating means increases, and a third section in which the braking force generated on the front wheel is further increased and wherein the braking force generated on the rear wheel is decreased when the amount of operation on the front-wheel brake operating means further increases, and wherein the plurality of control modes include modes which differ from each other in a magnitude of the braking force generated on the rear wheel in the first section,
- wherein the plurality of braking force control modes include a first control mode and a second control mode,
- wherein in a first mode first section in which the operation amount of said front-wheel brake operating means ranges from zero to a first mode first predetermined value, the braking force generated on said rear wheel gradually increases correspondingly to an increase in said operation amount,
- wherein in a second mode first section in which the operation amount of said front-wheel brake operating means ranges from zero to a second mode first predetermined value, the braking force generated on said rear wheel gradually increases correspondingly to an increase in said operation amount, and this braking force is set to be smaller than the corresponding braking force generated on said rear wheel in said first mode first section, and
- wherein in said second control mode, like in said first control mode, in a second mode second section in which the operation amount of said front-wheel brake operating means ranges from said second mode first predetermined value to a second mode second predetermined value greater than said second mode first predetermined value, the braking force generated on said rear wheel is maintained at a maximum value in said second mode first section irrespectively of an increase in said operation amount, and this braking force is controlled to be smaller than the corresponding braking force generated on said rear wheel in said first mode second section.

8. The brake control system according to claim 7, wherein:
- wherein in the first control mode, when the front-wheel brake operating means is operated, the braking force generated by the front wheel brake means is generated according to the operation amount of the front-wheel braking means, wherein a braking force interlocked with the operation amount of the front-wheel brake operating means is generated on the rear wheel by the rear wheel brake means for which no operation is made,
- wherein in a first mode second section in which the operation amount of said front-wheel brake operating means ranges from said first mode first predetermined value to a first mode second predetermined value greater than said first mode first predetermined value, the braking force generated on said rear wheel is maintained at a maximum value in said first mode first section, irrespectively of an increase in said operation amount,
- wherein in a first mode third section in which the operation amount of said front-wheel brake operating means is in excess of said first mode second predetermined value, the braking force generated on said rear wheel gradually decreases to zero correspondingly to an increase in said operation amount,
- wherein said second control mode when said front-wheel brake operating means is operated, a braking force is generated by said front-wheel brake means according to the operation amount of said front-wheel brake operating means whereas a braking force interlocked with the operation amount of said front-wheel brake operating means is generated on said rear wheel by said rear-wheel brake means for which no operation is made,
and
- wherein said electronic control means causes said front-wheel and rear-wheel brake means to generate braking forces according to the control mode selected.

9. The brake control system according to claim 8, wherein said second control mode like in said first control mode, in a second mode third section in which the operation amount of said front-wheel brake operating means is in excess of said second mode second predetermined value, the braking force generated on said rear wheel decreases correspondingly to an increase in said operation amount, and said operation amount at a point where said braking force is minimized is set to be greater than the corresponding operation amount in said first control mode.

10. The brake control system according to claim 7, wherein said mode change-over means comprises a switch provided on a handle bar.

11. The brake control system according to claim 10, wherein
- said first control mode and said second control mode are configured that when said rear-wheel brake operating means is operated, a braking force is generated by said rear-wheel brake means according to the operation amount of said rear-wheel brake operating means whereas a braking force interlocked with said operation amount of said rear-wheel brake operating means is generated by said front-wheel brake means for which no operation is made,
- wherein the braking force generated on said rear wheel is set to be greater than the braking force generated on said front wheel; and
- wherein the operation amount of said rear-wheel brake operating means at which braking of said front wheel is started is set to be greater in said second control mode than in said first control mode.

12. A motorcycle, said motorcycle comprising the brake control system according to claim 7.

13. A method of providing brake control for a vehicle, said method comprising:
providing a plurality of preprogrammed control modes in a memory;
sensing an operation of a front-wheel brake operating unit;
increasing a braking force generated on a front wheel and a rear wheel when an amount of operation of the front-wheel brake operating unit increases;
further increasing a braking force generated on the front wheel and decreasing the braking force generated on the rear wheel when the amount of operation of the front-wheel brake operating further increases, and
selecting different control modes of a plurality of control modes based upon a switch operated by a vehicle operator,
wherein each of the plurality of control modes includes a first section, second section and third section,
wherein in a first mode first section in which the operation amount of said front-wheel brake operating unit ranges from zero to a first mode first predetermined value, the braking force generated on said rear wheel gradually increases correspondingly to an increase in said operation amount,
wherein in a second mode first section in which the operation amount of said front-wheel brake operating unit ranges from zero to a second mode first predetermined value, the braking force generated on said rear wheel gradually increases correspondingly to an increase in said operation amount, and this braking force is set to be smaller than the corresponding braking force generated on said rear wheel in said first mode first section, and
wherein a second mode second section in which the operation amount of said front-wheel brake operating unit ranges from said second mode first predetermined value to a second mode second predetermined value greater than said second mode first predetermined value, the braking force generated on said rear wheel is maintained at a maximum value in said second mode first section irrespectively of an increase in said operation amount, and this braking force is controlled to be smaller than the corresponding braking force generated on said rear wheel in said first mode second section.

14. The method according to claim 13, wherein:
wherein in the first control mode, when the front-wheel brake operating unit is operated, the braking force generated by the front wheel brake device is generated according to the operation amount of the front-wheel braking unit, wherein a braking force interlocked with the operation amount of the front-wheel brake operating unit is generated on the rear wheel by the rear wheel brake device for which no operation is made,
wherein in a first mode second section in which the operation amount of said front-wheel brake operating unit ranges from said first mode first predetermined value to a first mode second predetermined value greater than said first mode first predetermined value, the braking force generated on said rear wheel is maintained at a maximum value in said first mode first section, irrespectively of an increase in said operation amount,
wherein in a first mode third section in which the operation amount of said front-wheel brake operating unit is in excess of said first mode second predetermined value, the braking force generated on said rear wheel gradually decreases to zero correspondingly to an increase in said operation amount,
wherein said second control mode when said front-wheel brake operating unit is operated, a braking force is generated by said front-wheel brake device according to the operation amount of said front-wheel brake operating unit whereas a braking force interlocked with the operation amount of said front-wheel brake operating unit is generated on said rear wheel by said rear-wheel brake device for which no operation is made, and
wherein said electronic control unit causes said front-wheel and rear-wheel brake devices to generate braking forces according to the control mode selected.

15. The method according to claim 14, wherein said second control mode, in a second mode third section in which the operation amount of said front-wheel brake operating unit is in excess of said second mode second predetermined value, the braking force generated on said rear wheel decreases correspondingly to an increase in said operation amount, and said operation amount at a point where said braking force is minimized is set to be greater than the corresponding operation amount in said first control mode.

16. The method according to claim 13, wherein
said first control mode and said second control mode are configured that when said rear-wheel brake operating unit is operated, a braking force is generated by said rear-wheel brake device according to the operation amount of said rear-wheel brake operating unit whereas a braking force interlocked with said operation amount of said rear-wheel brake operating unit is generated by said front-wheel brake device for which no operation is made,
wherein the braking force generated on said rear wheel is set to be greater than the braking force generated on said front wheel; and
wherein the operation amount of said rear-wheel brake operating unit at which braking of said front wheel is started is set to be greater in said second control mode than in said first control mode.

* * * * *